United States Patent [19]
Harada

[11] 3,872,821
[45] Mar. 25, 1975

[54] CATALYTIC CONVERTER FAILURE ALARM DEVICE

[75] Inventor: Masanori Harada, Yokohama, Japan

[73] Assignee: Nissan Motor Company, Limited, Yokohama, Japan

[22] Filed: Dec. 17, 1973

[21] Appl. No.: 425,125

[30] Foreign Application Priority Data
Dec. 20, 1972 Japan.............................. 47-146287

[52] U.S. Cl............. 116/106, 23/288 F, 116/114.5
[51] Int. Cl..................... G08b 17/04, G01k 11/06
[58] Field of Search ........ 116/106, 114.5, 112, 358, 116/101, 103; 23/288 F, 288 FA; 137/72; 220/89 B

[56] References Cited
UNITED STATES PATENTS

| | | | |
|---|---|---|---|
| 1,723,902 | 8/1929 | Wainwright............... | 116/114.5 UX |
| 3,079,886 | 3/1963 | Green, Jr...................... | 116/114.5 X |
| 3,083,084 | 3/1963 | Raymond........................ | 23/288 FA |
| 3,094,394 | 6/1963 | Innes et al. ..................... | 23/288 FA |
| 3,252,767 | 5/1966 | Lentz................................ | 23/288 F |

*Primary Examiner*—Richard C. Queisser
*Assistant Examiner*—Daniel M. Yasich
*Attorney, Agent, or Firm*—Robert E. Burns; Emmanuel J. Lobato; Bruce L. Adams

[57] ABSTRACT

A plug blocking a hole in the housing of a catalytic converter fuses to allow exhaust gas to escape to the atmosphere through the hole and produce an audible sound when the temperature of the exhaust gas is above a level at which the catalyst is active.

11 Claims, 9 Drawing Figures

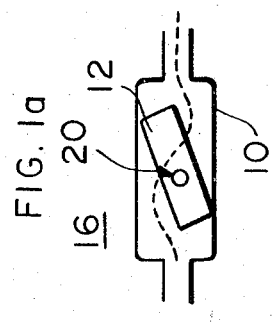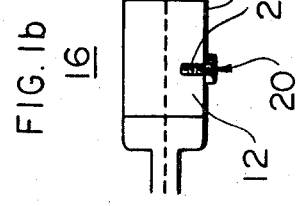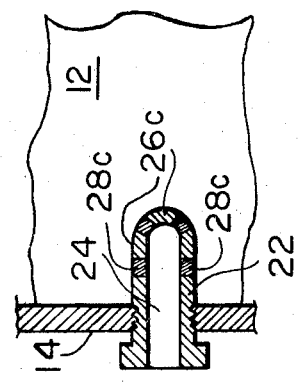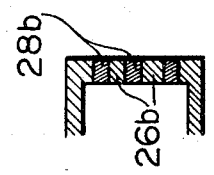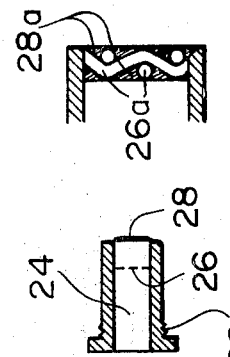

FIG. 3a
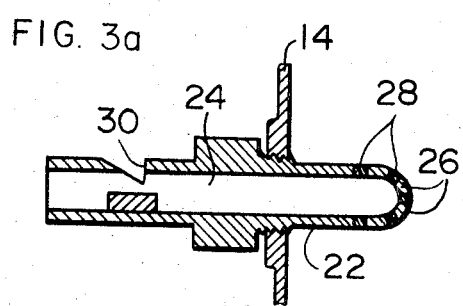
FIG. 3c 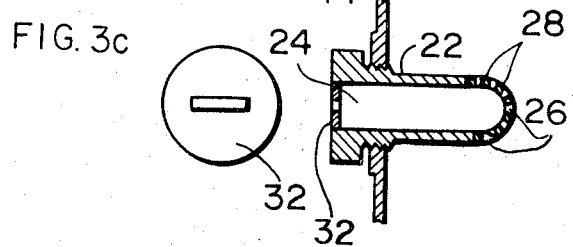 FIG. 3b

CATALYTIC CONVERTER FAILURE ALARM DEVICE

The present invention relates to a failure alarm device for a catalytic converter for an exhaust system of an engine which produces an audible indication when the exhaust gas temperature is above a level of which the catalyst is active.

In an exhaust purifying catalytic converter, it is often observed that the operating temperature of the catalyst rises to an undesirably high level, for example 800° – 1,300°C, at which catalytic activity is destroyed and warping of the converter structure occurs. Such a high temperature tends to occur when the automobile is driven at a relatively high speed or when the power jets of the carbureter cut in, at which time the level of oxidizable constitutents of the exhaust gas also becomes relatively high. Once catalytic activity has been destroyed, the catalyst has to be replaced as promptly as possible.

In order to sense a condition in which the temperature has risen to the extent that the catalyst will be destroyed and to warn the engine operator of the necessity of replacement of the catalyst, there has been proposed various electric apparatus. These produce a signal representing a high temperature condition when an associated temperature sensor such as a thermometer or thermistor installed in or adjacent to a portion of the catalytic converter and exposed to the catalyst temperature indicates a predetermined high temperature level. Such apparatus, however, require a considerable number of component parts. Moreover, the temperature sensor such as the thermometer or thermistor is liable to wear or break in a relatively short time.

Accordingly, it is an object of the present invention to provide a failure alarm device for a catalytic converter which is free from the shortcomings described above.

It is another object of the invention to provide an improved failure alarm device to audibly indicate an increase of catalyst operating temperature to an undesirably high level, thereby permitting timely replacement of a destroyed catalyst.

These and other objects, features and advantages of the present invention will be more apparent upon consideration of the following description with reference to the accompanying drawing, in which:

FIG. 1a is a side plan view of a catalytic converter provided with an embodiment of a failure alarm device according to the present invention;

FIG. 1b is similar to FIG. 1a but is a top plan view thereof;

FIGS. 2a to 2d are side sectional views each showing a preferred embodiment of a failure alarm device according to the invention; and FIGS. 3a and 3b are side sectional views each showing a further preferred embodiment of a failure alarm device according to the invention and FIG. 3c is a front plan view of the alarm device shown in FIG. 3b.

Referring to FIGS. 1, a failure alarm device 20 of the invention generally comprises a tube 22 extending through a hole (no numeral) in a wall 14 of a housing 10 of a catalytic converter 16 having a catalyst 12. One end of the tube 22 is open to the atmosphere, and the other opens into the interior of the catalytic converter 16 and is exposed to exhaust gas passing therethrough. As shown in FIG. 2, a perforated screen 26 and a fusible plug 28 are disposed in a passageway 24 through the tube 22, with the fusible plug 28 normally blocking the passageway 24 and preventing exhaust gas from escaping to the atomsphere therethrough. If, however, the temperature of the exhaust gas exceeds a predetermined level above which the activity of the catalyst 12 and possibly the catalyst itself is destroyed, the fusible plug 28 fuses or melts to unblock the passageway 24. Exhaust gas escaping through the passageway 24 to the atmosphere will make an audible sound which will signal to the engine operator that the catalytic converter 16 has failed. The perforated screen 26 holds in catalyst particles in the catalytic converter 16 that might otherwise be carried through the tube or tubular element 22 into the atmosphere and allows exhaust gases to pass therethrough to the atmosphere. If the catalytic converter 16 is disposed upstream of an engine muffler (not shown), the hole provided in the exhaust system through the passageway 24 will have the effect of by-passing the muffler, thus providing a big sound.

In FIG. 2(a), the fusible plug 28 is provided between the perforated screen 26 and the atmosphere. If desired, however, the perforated screen 26 and fusible plug 28 may be integrally formed as shown in FIGS. 2b to 2d, in which the perforated screen 26 serves to support the fusible plug 28.

In accordance with the invention, an acoustical amplifier in the form of, for example, a whistle 30 (FIG. 3a) or a slitted disc 32 (FIG. 3b) may be provided in the passageway 24 to produce a bigger sound to indicate catalytic converter failure to the operator.

If the catalyst 12 is in the form of balls or pellets, the tube 22 may serve as a catlyst replenishing port.

In general, the temperature at which catalyst activity is destroyed is about 800° to 900°C, while the catalyst itself is fused and warped at about 1,200° to 1,300°C. Accordingly, it is required that the fusible plug 28 utilized in the alarm device 20 described above be fusible at a temperatures between 900° and 1,200°c. Practically available metals which meet the above mentioned requirement are, for example, gold alloys containing 1.5% palladium (melting point 1,100°C) or 5.5% palladium (melting point 1,200°C), copper alloys containing zinc or aluminium (melting point of copper itself is 1,083°C), or iron containing 4 to 4.5% carbon (melting point 1,150° to 1,200°C). It is preferable that the fuse 22 be made of austenitic stainless steel or a high temperature resistant, iron-, cobalt- or nickel-base alloys.

Although the foregoing description assumes the use of the fuse 22, the fusible plug 28 may be screwed or otherwise fixed in the hole in the housing 10 itself with all other component parts being omitted.

What is claimed is:

1. In combination, a catalytic converter having a housing having means defining an exhaust gas flow path for heated exhaust gases from an internal combustion engine and a catalyst therein, an alarm device for indicating that the temperature of exhaust gases in said flow path exceeds a predetermined temperature below which said catalyst is effective and above which said catalyst is ineffective, said alarm device comprising a tubular element and having therein sensing means for sensing the temperature of exhaust gases in said flow path, said sensing means comprising a fusible plug normally closing said tubular element to preclude flow of exhaust gases therethrough from said path to the atmosphere, said fusible plug comprising a metal fusible when the temperature of the exhaust gases in said flow path exceeds said predetermined temperature to allow flow of exhaust gases through said tubular element to the atmosphere, said tubular element having means for developing an audible sound in response to the flow of exhaust gases through said tubular element into the atmosphere, and screen means in said tubular element coacting with said fusible plug and operative after said fusible plug is melted by the exhaust gases when the gases reach about said predetermined temperature for allowing the exhaust gases to pass through said screen means and out said tubular element to the atmosphere and precluding said catalyst from passing through said tubular element.

2. In the combination according to claim 1, in which said screen means is disposed within said fusible plug.

3. In the combination according to claim 1, in which said fusible plug and screen means are integral.

4. In the combination according to claim 1, in which metal comprises a gold alloy.

5. In the combination according to claim 1, in which said metal comprises an austenitic steel.

6. In the combination according to claim 1, in which said metal comprises an iron and cobalt alloy.

7. In the combination according to claim 1, in which said metal comprises a nickel base alloy.

8. In the combination according to claim 1, in which said metal comprises a metal fusible in the order of 800°C.

9. In the combination according to claim 1, in which said means for developing an audible sound comprises a whistle built on said tubular element.

10. An alarm device for a catalytic converter having a housing having means defining an exhaust gas flow path for heated exhaust gases from an internal combustion engine and a catalyst of solid particles therein, said alarm device comprising a tubular element mountable on a housing of a catalytic converter during use of the alarm device and having a portion extending into said gas flow path when mounted on said housing and a portion extending exteriorly of said housing, means on said tubular element for developing an audible sound in response to the flow of exhaust gases through said tubular element, a fusible plug plugging said tubular whistle to preclude flow of exhaust gases therethrough when said tubular element is mounted on said housing, said fusible plug comprising a metal fusible by said exhaust gases when in use and when the exhaust gases exceed a predetermined temperature above which a catalyst in said catalytic converter is rendered ineffective, and screen means coacting with said fusible plug for allowing exhaust gases to pass through said tubular element of the alarm device when said fusible plug is melted and precluding catalyst particles from passing therethrough.

11. An alarm for a catalytic converter according to claim 10 in which said screen means is built into said fusible plug.

* * * * *